United States Patent Office 3,213,940
Patented Oct. 26, 1965

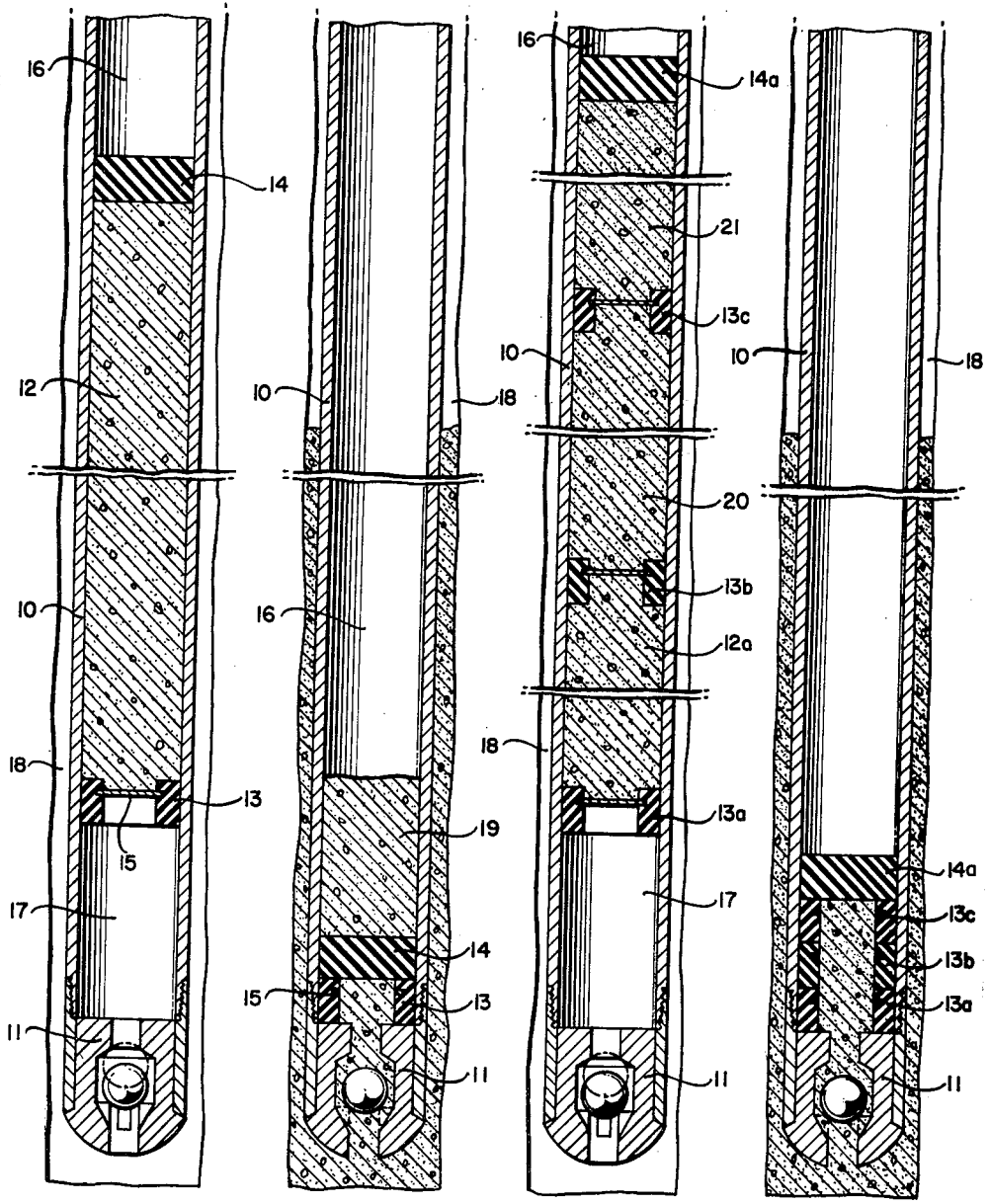

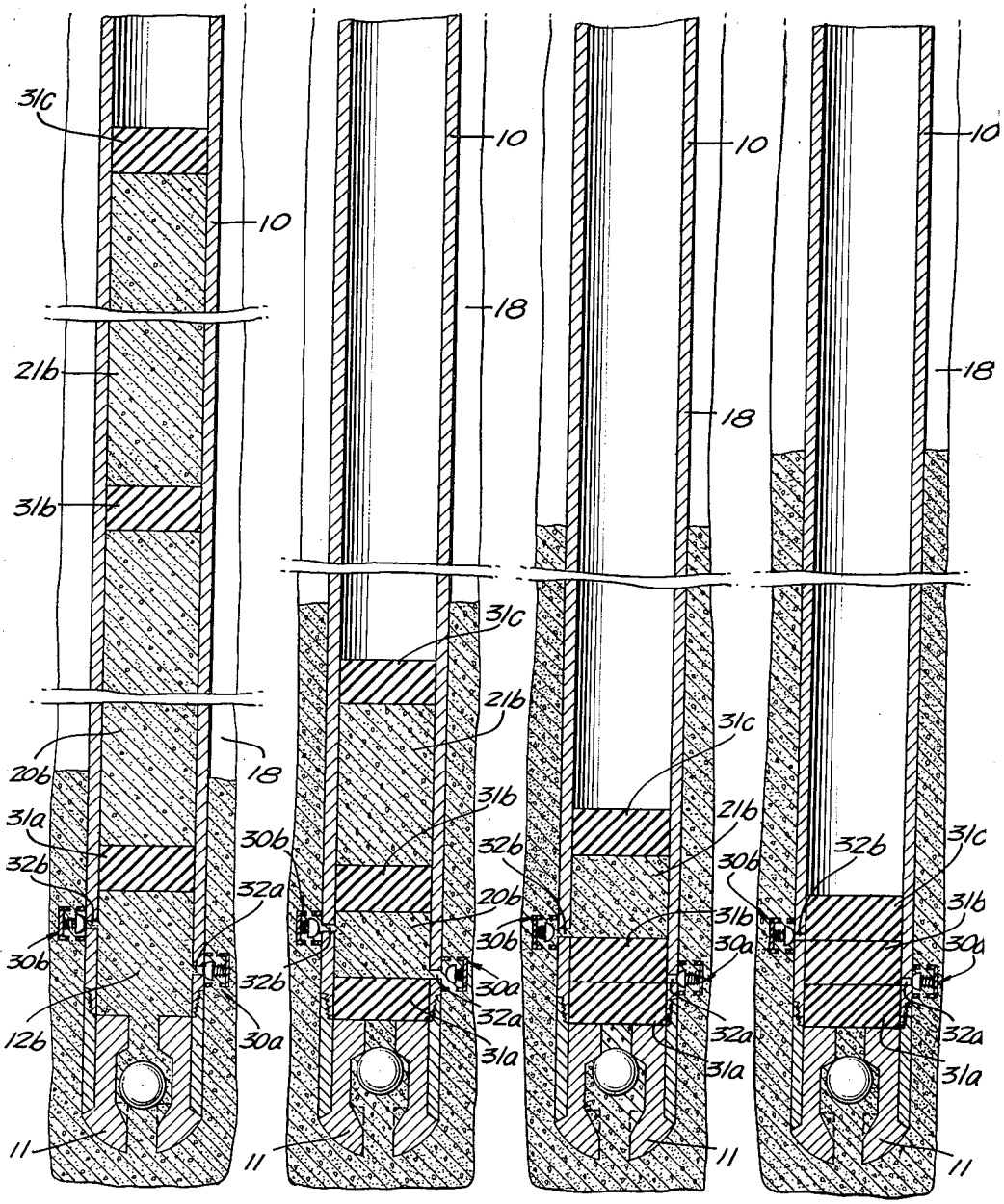

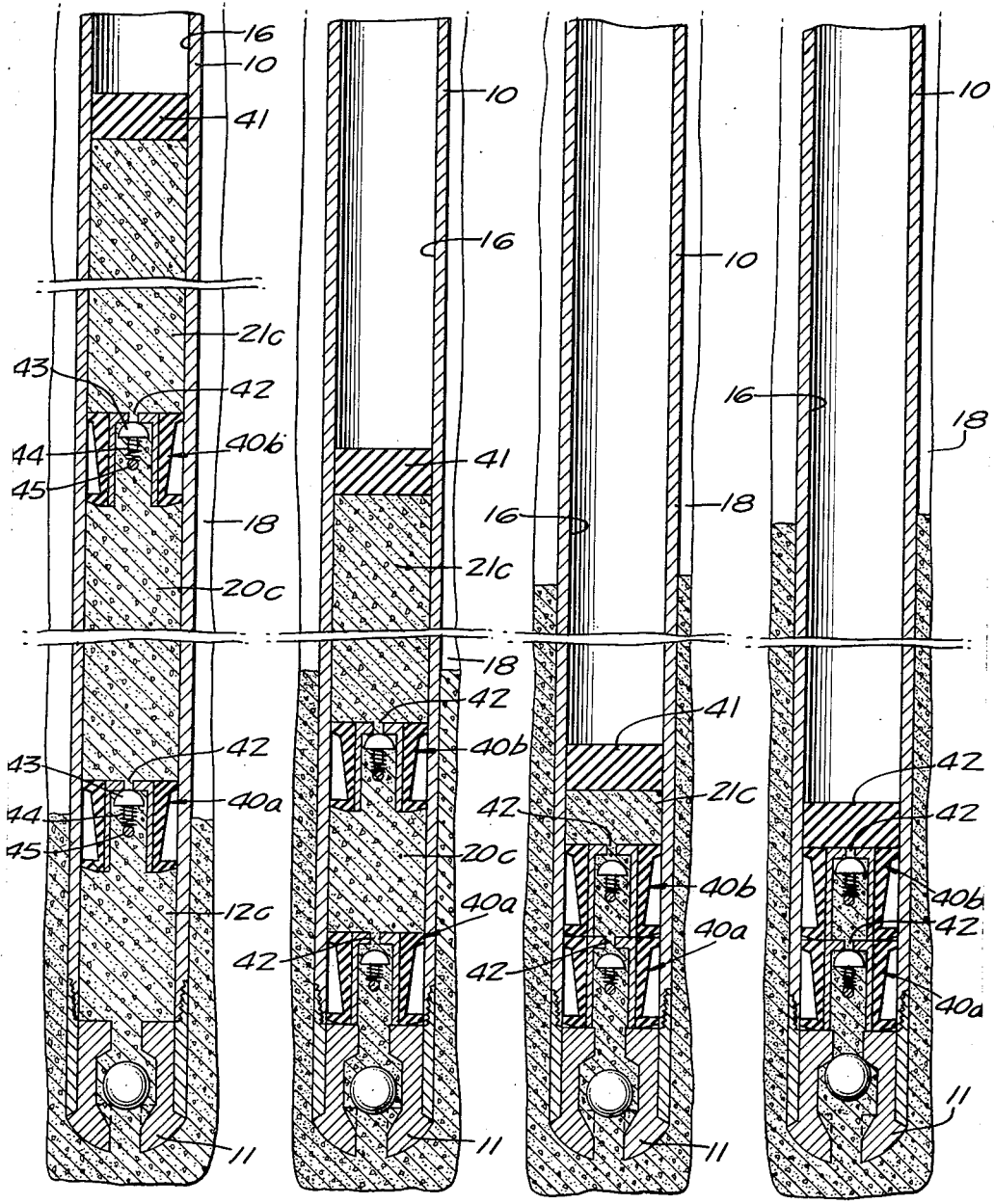

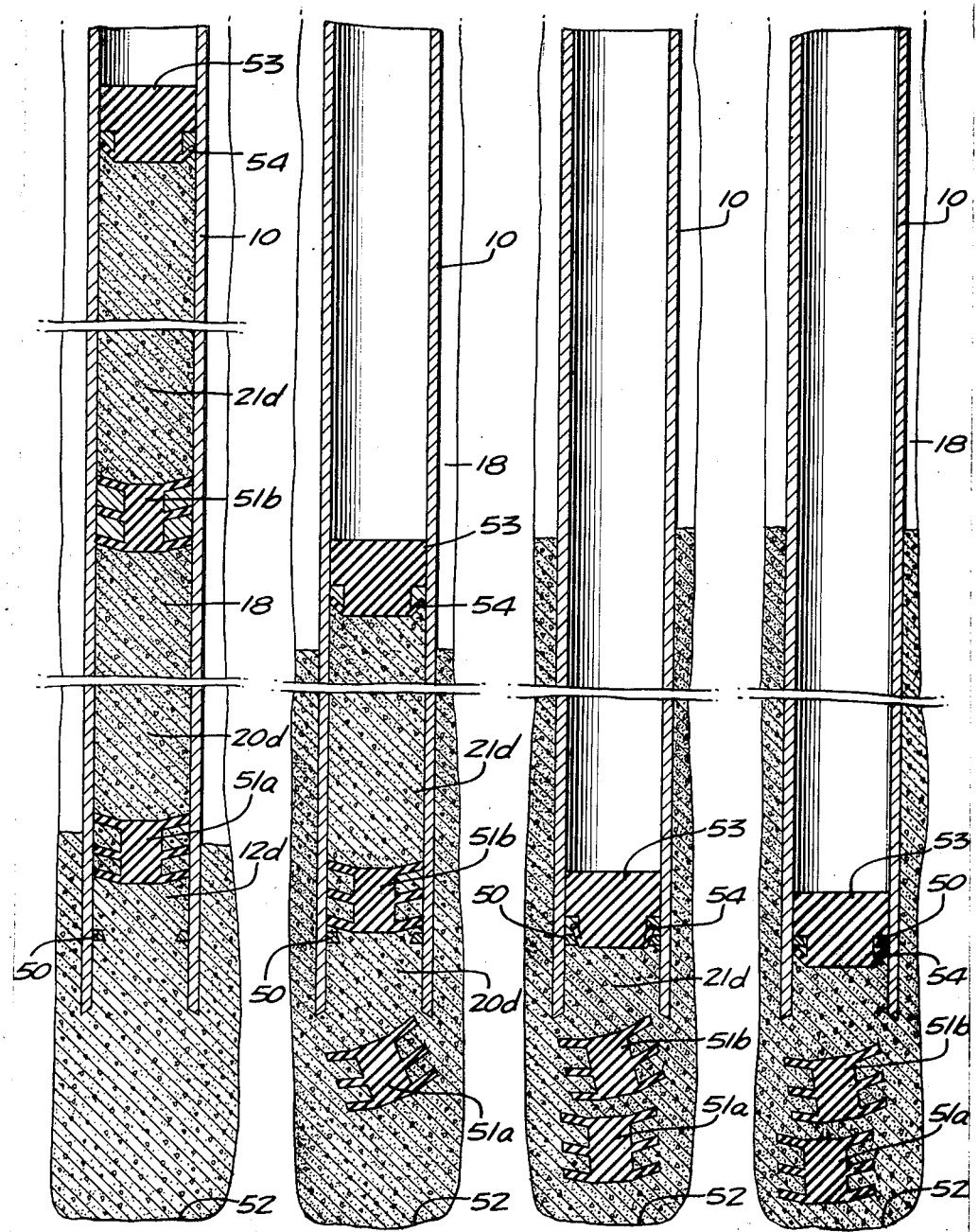

3,213,940
METHOD OF CEMENTING WELLS
Forrest H. Wood, 1301 Camino Monte,
Farmington, N. Mex.
Filed Apr. 19, 1962, Ser. No. 188,749
6 Claims. (Cl. 166—26)

This is a continuation-in-part application of my co-pending application, Serial No. 57,678, filed September 22, 1960, now abandoned.

This invention relates to the cementing of wells and is particularly directed to an improved method which insures that substantially all of the cement slurry passes from the casing into the well, and that substantially none of it remains in the casing.

In conventional well cementing procedure, the casing string is provided with a float collar or shoe at or near the lower end thereof. The casing is run into the well to the desired setting depth, and is then filled with mud fluid. A rupture-type wiper plug is inserted in the casing and the desired amount of cement slurry is pumped into the casing above this rupture plug, which is also called a "bottom plug." A non-rupturing wiper plug, commonly called a "top plug," is inserted above the cement slurry in the casing. The cement slurry and the plugs are displaced down through the interior of the casing string by pumping mud or water under pressure above the "top plug." When downward motion of the "bottom plug" is arrested by contact with the float collar or shoe, its diaphragm is ruptured by pump pressure thereby allowing the cement slurry to pass through the bottom plug and into the well. When the top plug reaches the bottom of the casing, its downward motion is arrested, but unfortunately this does not mean that all of the cement slurry has been pumped into the well. Instead, a column of cement of considerable height may remain in the lower end of the casing string above the top plug, the cement slurry having passed around the top plug during its sliding movement downward within the interior of the casing. This column of cement "sets" or "cures" and must be subsequently drilled out of the casing.

In accordance with my invention, I avoid the formation of this column of cement within the lower end of the casing following completion of the cementing operation. This result is achieved by placing one or more bottom plugs above the column of cement slurry in the casing in addition to the bottom plug placed in the casing at the bottom of the column of cement slurry prior to pumping it into the well. A single top plug is inserted into the casing above the bottom plugs and the pumping operation proceeds as described above. An illustrative example will explain the operation: If three plugs each having 90% efficiency were used, the first bottom plug might bypass ten cubic feet of cement slurry. The second bottom plug would then displace nine cubic feet and bypass only one cubic foot. The third or top plug would displace 0.9 cubic foot and leave only 0.1 cubic foot of cement slurry in the casing, for an overall efficiency of 99.9%.

In the drawings:

FIGURES 1 and 2 illustrate the conventional cementing operation as taught by the prior art.

FIGURES 3 and 4 illustrate the steps in the method of my invention.

FIGURES 5, 6, 7 and 8 illustrate the steps in practicing the method of my invention using a modified form of apparatus.

FIGURES 9, 10, 11 and 12 illustrate the steps in practicing the method of my invention using a second modified form of apparatus.

FIGURES 13, 14, 15 and 16 illustrate the steps in practicing the method of my invention using a third modified form of apparatus.

Referring now to the drawings, FIGURE 1 shows a column of cement slurry being pumped downward through a casing string. FIGURE 2 shows the column of cement slurry remaining in the casing string after both the "bottom" and the "top" plugs reach the lower limit of their travel.

FIGURE 3 illustrates the method employing the steps of my invention and illustrating the use of a plurality of bottom plugs and a single top plug. FIGURE 4 shows the position of the plugs at the end of the cementing operation and showing that no cement slurry remains on top of the top plug.

The casing string generally designated 10 is made up of conventional sections of casing, pipe or tubing connected end-to-end by means of threaded couplings, not shown. A float shoe 11 of conventional form is provided on the lower end of the casing string 10.

In the conventional cementing operation, shown in FIGURES 1 and 2, a column of cement slurry 12 within the casing 10 is confined between a rupture-type or bottom plug 13 and a non-rupture top plug 14. Both of these plugs 13 and 14 are of conventional type and the plug 13 has a conventional rupture disc 15. Mud or water under pressure is pumped into the interior 16 of the casing 10 above the top plug 14 and this displaces the column of cement slurry 12 and the plugs 13 and 14 downward within the casing 10, driving mud fluid out of the space 17 below the bottom plug 13 downward through the float shoe 11 into the well and upward through the annular space 18. When the bottom plug 13 reaches the lower end of its travel, the hydraulic pressure of the cement slurry 12 ruptures the disc 15 and permits the slurry to pass downward through the float shoe 11 into the well and upward into the annular space 18 outside the casing 10. However, not all of the cement slurry passes through the float shoe 11; some of it remains as a column or post 19 within the lower end of the casing 10 and above the final position of the top plug 14. This cement slurry leaked by the top plug as the top plug passed downward through the interior of the casing 10.

Presumably much of the leakage occurred when the top plug passed through the various coupling connections, not shown, connecting the joints of casing end-to-end. The presence of the cement column or post is undesirable since it must be drilled out by conventional means after the cement slurry has hardened.

In accordance with my invention this column or post 19 of cement slurry above the top plug 14 is substantially eliminated. In the method of my invention as shown in FIGURES 3 and 4, the casing 10 and float shoe 11 are the same as that previously described. Instead of a single rupture-type bottom plug 13, however, I place one of these 13a at the bottom of the cement slurry column 12a and one or more additional rupture-type bottom plugs 13b, 13c thereabove. The plug 13b is initially placed at the top of the column 12a of cement slurry and the plug 13c is rested directly on the plug 13b. The top plug 14a of the non-rupture-type is initially placed directly on the plug 13c.

When pressure is applied to the interior 16 of the casing above the top plug 14a, as described above, the column 12a of cement slurry and all of the plugs move downward displacing mud fluid from the space 17 causing it to pass downward through the float shoe 11. Even if the plugs 13a, 13b, and 13c, seal with efficiency approaching 100% when initially installed, the wear caused by sliding along the interior of the casing in a typical installation several thousand feet deep causes a loss in sealing efficiency and consequent leakage of cement slurry.

If the sealing efficiency falls to 90%, the plug 13b might allow ten cubic feet of slurry to pass thereby separating the plugs 13b and 13c by the slurry-filled space 20. The plug 13c would then displace nine cubic feet and bypass only one cubic foot into the space 21 between the plugs 13c and 14a. Similarly, the top plug 14a would displace 0.9 cubic foot and leave only 0.1 cubic foot of cement slurry in the casing above the top plug 14a. In the drawings this small quantity of cement slurry has been omitted for clarity of illustration.

When the plug 13a reaches the bottom of its travel its rupture disc is broken and column 12a of cement slurry above the first plug 13a is forced through it by the downward displacement of the plug 13b. When the plug 13b reaches the lower limit of its travel, its disc is ruptured and most of the cement slurry which bypassed the plug 13b into the space 20 is displaced through the interior of the plug 13b and plug 13a. This action continues until all of the bottom plugs have been ruptured and until the non-rupturing top plug reaches the lower limit of its travel. This latter condition is shown in FIGURE 4 of the drawings. Substantially no cement slurry remains within the casing above the final position of the top plug 14a.

In the method of my invention as shown in FIGURES 5, 6, 7 and 8, some of the apparatus employed is modified from that shown in FIGURES 3 and 4. However, the casing 10 and float shoe 11 may be the same as shown in FIGURES 1, 2, 3 and 4. The section or joint of casing immediately above the shoe 11 is modified by providing one or more check valve assemblies in the wall of the casing. Two check valve assemblies 30a and 30b are illustrated but it will be apparent from the description of the operation that the number provided will depend on the number of plugs which are to be used. The cement slurry column 12b is pumped into the casing 10 with or without (shown without in FIGURES 5, 6, 7 and 8), a bottom plug similar to plug 13 at the bottom of the column. Use of a bottom plug at the bottom of the column of cement slurry only serves to separate the slurry from the fluid, usually drilling mud, present within the casing. Two or more plugs 31a, 31b and 31c are placed on top of the cement slurry column 12b and each of these plugs may be of the "top plug" type like plugs 14 and 14a, in that they are not adapted to have fluid pumped by or through them.

Fluid is introduced above plug 31c to pump the cement slurry column 12b down the casing in a conventional manner. As described in reference to FIGURE 3, some of the cement slurry will bypass the first plug 31a on top of the cement column and separate that plug from the next plug 31b forming a small column 20b of cement slurry, as shown in FIGURE 5. In turn, some, but not all, of the cement column 20b will bypass plug 31b and separate that plug from plug 31c forming an even smaller column 21b of cement slurry. If more plugs are used on top of the cement column 12b than the three shown, then each column of cement slurry separating the successive plugs will become increasingly smaller. The number of plugs to be used in a particular cementing operation will be determined by a number of factors such as, the depth of the casing, the size of the casing or tubing, the amount of cement remaining in the casing which will be tolerable, etc.

As shown in FIGURE 5, the cement column 12b is pumped out through the float shoe 11 and flows upwardly in the annular space 18 outside of the casing 10. When plug 31a reaches the float shoe 11 the column 12b has been completely pumped out of the casing and the plug 31a closes the opening through the float shoe, as shown in FIGURE 6. Further application of fluid pressure above plug 31c causes opening of check valves 30a and 30b which may or may not have been open during the displacement of cement column 12b depending on the relative resistances to fluid flow presented by the opening through the float shoe and by the check valves 30a and 30b. The cement slurry column 20b passes out through openings 32a and 32b in the casing associated with check valves 30a and 30b, respectively, until plug 31b engages plug 31a, thereby causing closing off of opening 32a by check valve 30a. Continued fluid pressure above plug 31c causes the cement slurry column 21b to pass out through opening 32b associated with check valve 30b into the annular space 18 until plug 31c engages plug 31b. The small amount of cement slurry (not shown) which may have bypassed plug 31c remains in the casing above that plug.

Each of the check valve assemblies 30a and 30b are of any convenient construction such as a spring biased valve stem mounted in a housing on the side of the casing (as shown) whereby fluid may pass outwardly through openings 32a and 32b in the casing but is prevented from passing from the well bore into the casing. As shown in FIGURES 7 and 8, the openings 32a and 32b are axially spaced along the casing 10 so that plugs 31b and 31c will each exhaust the fluid therebelow through the respective opening and then come to rest in a position adjacent and covering the openings 32a and 32b, respectively, to prevent or at least greatly inhibit the flow of fluid downwardly past the plugs and out through such openings into the annular space 18. The fluid pressure above plug 31c may then be reduced and the cement slurry is prevented from passing into the casing by the check valves 30a and 30b and by the seating of the ball in the float shoe in a conventional manner as shown.

Thus it may be seen that in practicing the method of my invention with the apparatus shown in FIGURES 5, 6, 7 and 8, plug 31a and check valves 30a and 30b cooperate to allow the cement column 20b to pass into the annular space 18 thereby accomplishing the same function as the rupturing of the frangible element in plug 13b to allow cement column 20 to pass into the annular space 18 in my method shown in FIGURES 3 and 4. Further, plug 31b cooperates with check valve 30b to allow cement column 21b to pass into the annular space just as the rupturing of the frangible element in plug 13c to allow cement column 21 to pass into the annular space in my method shown in FIGURES 3 and 4. Thus, although plugs 31a and 31b may be of the conventional "top plug" type, they function with check valves 30a and 30b to perform the function of conventional "bottom plugs" with frangible elements like plugs 13a, 13b and 13c. Plug 31c functions as a normal "top plug" in that fluid above the plug cannot be pumped into the annular space 18 either through the plug or through the casing.

In the method of my invention as shown in FIGURES 9, 10, 11 and 12, some of the apparatus employed is modified from that shown in FIGURES 3 and 4 or in FIGURES 5, 6, 7 and 8. However, the casing 10 and float shoe 11 may be of a conventional type as shown in FIGURES 1 through 8. The cement slurry column 12c is introduced into the casing with or without (shown without in FIGURES 9, 10, 11 and 12) a conventional bottom plug dividing the cement slurry column from the fluid below the cement slurry. One or more valved plugs 40a and 40b are placed on top of the cement slurry column 12c after the desired amount of cement has been pumped into the casing 10. A conventional top plug 41 is placed on top of plugs 40a and 40b so that plugs 40a, 40b and 41 are originally in contact with each other.

The valved plugs 40a and 40b are adapted to slidably engage the interior 16 of the casing 10 for urging fluid through the casing the same as conventional top and bottom plugs. Each valved plug 40a and 40b is provided with a central aperture 42 therethrough, a valve stem 43 adapted to close the aperture 42, and a spring 44 biasing the valve stem 43 to a closed position. The spring 44 may be mounted on a cross-pin 45 to support the valve stem 43 and spring in the body of the plug. The plugs 40a and 40b are oriented in the casing 10 such that if movement of the plug is prevented fluid may be pumped downwardly through the aperture 42 but fluid cannot flow upwardly through aperture 42 due to the closing of the aperture by valve stem 43.

As occurred with the apparatus previously described relative to FIGURES 3 through 8, during the downward movement of the cement column 12c and plugs 40a, 40b and 41 in the casing 10 due to the application of fluid pressure on top of plug 41, some of the cement slurry will bypass each of the plugs. The cement slurry which bypasses plug 40a will form a small column 20c between plug 40a and plug 40b and the cement slurry which bypasses plug 40b will form a smaller column 21c between plug 40b and plug 41. A small amount of cement slurry may bypass plug 41, although none is illustrated in FIGURES 9, 10, 11 and 12, and such cement slurry will remain in the casing at the completion of the cementing operation.

When plug 40a reaches the float shoe 11 further down movement will prevent by the float shoe and the continued pressure on top of plug 41 will cause the valve in plug 40a to open. The cement column 20c will pass through aperture 42 in plug 40a and through the float shoe 11 into the annular space 18, as illustrated in FIGURE 10. When plug 40b engages plug 40a, as shown in FIGURE 11, the continued fluid pressure on top of plug 41 opens the valves in both plug 40a and plug 40b and the cement slurry column 21c passes through the apertures 42 in both plugs, through float shoe 11 and into annular space 18. With plug 41 engaging plug 40b, plug 40b engaging plug 40a, and plug 40a engaging the float shoe 11, as shown in FIGURE 12, the placement of the cement is completed and the ball in the float shoe 11 seats in a conventional manner to prevent reverse flow of the cement back into the casing.

In the method of my invention as shown in FIGURES 13, 14, 15 and 16, some of the apparatus employed is modified from the apparatus heretofore described. The casing 10 is substantially the same but has an annular baffle 50 provided on the interior of the casing near its lower end instead of a float shoe 11. Baffle 50 is in the form of an inwardly directed flange with a large central opening. A "pump through" type plug, such as plugs 51a and 51b, is adapted to engage the interior of the casing and force fluid through the casing and is also adapted to pass through the baffle 50 and out into the bottom 52 of the well bore. As with the previously described apparatus for practicing my method, a "pump through" plug may be inserted below the column 12d of cement slurry to serve the normal function of a "bottom plug" although such has not been illustrated. One or more pump through plugs (two illustrated and numbered as plugs 51a and 51b) are inserted on top of the cement column 12d and a top plug 53 is inserted on top of the uppermost pump through plug (plug 51b). Fluid pressure is introduced above plug 53 to urge the cement column 12d down the casing. As the cement column and plugs proceed down the casing some cement slurry will normally leak past plug 51a and will form a column 20d between plug 51a and plug 51b. Some of the cement slurry in column 20d may leak past plug 51b and will form a smaller column 21d between plug 51b and plug 53. A small amount of the cement slurry may leak past plug 53 which will remain above plug 53.

When plug 51a reaches the baffle 50 the column 12d of cement slurry will have been urged out of the bottom of the casing and upwardly in the annular space 18. The fluid pressure above plug 53 forces plug 51a through the baffle 50 into the bottom 52 of the well bore and also forces the cement column 20d into the well bore and upwardly in the annular space 18. Continued fluid pressure on top of plug 53 urges the plug 51b through the baffle 50 and the cement column 21d into the annular space 18. When plug 53 engages the baffle 50 its downward motion is stopped by the baffle. Plug 53 may be a conventional top plug or a "latching" type plug (as shown) which has means, such as a flange 54, for engaging the baffle 50 to prevent upward movement of the plug. A latching plug allows the pressure above the plug to be reduced without causing reverse flow of the cement into the casing.

Thus, it may be seen that numerous types of apparatus may be used to practice my method. The term "top plug" as used hereinafter refers to a plug adapted for sliding contact within the interior of a casing and which plug prevents further downward flow of fluid in the casing when the plug's downward motion is arrested at a predetermined location in the casing. The term "bottom plug" as used hereinafter refers to a plug adapted for sliding contact within the interior of a casing and which plug permits fluid present above the plug to pass from the interior of the casing to the exterior of the casing when the plug reaches a predetermined location in the casing.

Having fully described my invention, it is to be understood that I am not to be limited to the details herein set forth but that my invention is of the full scope of the appended claims.

I claim:

1. A method of introducing cement slurry into a well through a casing in the well comprising the steps of: placing a bottom plug in sliding contact with the interior of the casing, introducing cement slurry into the casing above the said bottom plug, placing at least one additional bottom plug in sliding contact with the interior of the casing above the cement slurry, placing a top plug in sliding contact with the interior of the casing above and free from the uppermost said bottom plug, and pumping liquid into the casing above the top plug to move the cement slurry and plugs downward within the casing, each bottom plug operable with the casing to permit cement slurry above that bottom plug to be introduced into the well when said plug terminates its downward travel in the casing.

2. A method of introducing cement slurry into a well through a casing in the well comprising the steps of: placing a bottom plug in sliding contact with the interior of the casing, introducing cement slurry into the casing above the bottom plug, placing a plurality of additional bottom plugs in sliding contact with the interior of the casing above the cement slurry, placing a top plug in sliding contact with the interior of the casing above the uppermost of said bottom plugs, and pumping liquid into the casing above the top plug to move the cement slurry and plugs downward within the casing, each bottom plug operable with the casing to permit cement slurry above that bottom plug to be introduced into the well when said plug terminates its downward travel in the casing.

3. A method of introducing cement slurry into a well through a casing in the well comprising the steps of: placing a bottom plug in sliding contact with the interior of the casing, introducing cement slurry into the casing above the bottom plug, placing a plurality of additional bottom plugs in sliding contact with the interior of the casing above the cement slurry, each bottom plug having a frangible element, placing a top plug in sliding contact with the interior of the casing above the uppermost of said bottom plugs, pumping liquid into the casing above the top plug to move the cement slurry and plugs downward within the casing, and continuing the pumping operation to rupture the said frangible element in each of the bottom plugs.

4. A method of introducing cement slurry into a well through a casing in the well comprising the steps of: introducing cement slurry into the casing, placing at least one bottom plug in sliding contact with the interior of the casing above the cement slurry, placing a top plug in sliding contact with the interior of the casing above and free from the uppermost said bottom plug, and pumping fluid into the casing above said top plug to move the cement slurry and plugs downward within the casing, each said bottom plugs cooperating with a predetermined portion of the casing to permit cement slurry above that bottom plug to be introduced into the well.

5. A method of introducing cement slurry into a well through a casing having at least one opening in the side of the casing at a predetermined location comprising the steps of: introducing cement slurry into the casing, placing at least two separate plugs in sliding contact with the interior of the casing above the cement slurry, the number of said plugs so placed exceeding the number of openings in the casing by one, and pumping fluid into the casing above the uppermost of said plugs to move the cement slurry and plugs downward in the casing, terminating the downward movement of each of said plugs except the uppermost plug below one of the openings in the casing for cement slurry above such plug to be urged out of such opening, terminating downward movement of the uppermost said plug at a location for preventing fluid above that plug to be urged out of any of the openings in the casing.

6. A method of introducing cement slurry into a well through a casing in the well comprising the steps of: introducing cement slurry into the casing, placing at least one bottom plug in the casing above the cement slurry, placing a top plug above and free from the uppermost said bottom plug, and pumping fluid into the casing above said top plug to move the cement slurry and plugs downward in the casing.

References Cited by the Examiner
UNITED STATES PATENTS

| | | | |
|---|---|---|---|
| 2,167,747 | 8/39 | Dyer | 166—153 |
| 2,197,396 | 4/40 | Maines | 166—155 |
| 2,217,708 | 10/40 | Scaramucci | 166—28 X |
| 2,630,179 | 3/53 | Brown | 166—155 X |
| 2,662,602 | 12/53 | Schnitter | 166—28 X |

CHARLES E. O'CONNELL, *Primary Examiner.*